(12) United States Patent
Holmstrom et al.

(10) Patent No.: US 11,492,052 B2
(45) Date of Patent: Nov. 8, 2022

(54) TRUCKS INCLUDING EXTERNALLY MOUNTED COMBINATION ABSORBER AND SEAL MEMBER

(71) Applicant: Toyota Motor Engineering & Manufacturing North America, Inc., Plano, TX (US)

(72) Inventors: Adam D. Holmstrom, Pinckney, MI (US); Ryan C. Harris, Saline, MI (US); Scott W. Shopoff, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 59 days.

(21) Appl. No.: 17/218,443

(22) Filed: Mar. 31, 2021

(65) Prior Publication Data
US 2022/0315132 A1    Oct. 6, 2022

(51) Int. Cl.
| | |
|---|---|
| *B62D 33/02* | (2006.01) |
| *B62D 33/06* | (2006.01) |
| *B62D 35/00* | (2006.01) |
| *B60R 13/04* | (2006.01) |
| *B60R 13/08* | (2006.01) |
| *B60R 13/07* | (2006.01) |

(52) U.S. Cl.
CPC ......... *B62D 33/0604* (2013.01); *B62D 33/02* (2013.01); *B62D 35/00* (2013.01); *B60R 13/04* (2013.01); *B60R 13/07* (2013.01); *B60R 13/08* (2013.01)

(58) Field of Classification Search
CPC ............... B62D 33/02; B62D 33/0604; B62D 35/00–008; B60R 13/04; B60R 13/06; B60R 13/07; B60R 13/08; B60R 13/0815
See application file for complete search history.

(56) References Cited

U.S. PATENT DOCUMENTS

| | | | |
|---|---|---|---|
| 4,398,758 A | * | 8/1983 | Tabares ................... B60R 13/04 70/18 |
| 4,613,183 A | * | 9/1986 | Kesling .................. B62D 33/02 296/183.1 |
| 4,911,493 A | | 3/1990 | Muirhead |

(Continued)

FOREIGN PATENT DOCUMENTS

WO    2008001521 A1    1/2008

*Primary Examiner* — Gregory A Blankenship
(74) *Attorney, Agent, or Firm* — Dinsmore & Shohl LLP

(57) ABSTRACT

A pickup truck includes a passenger cabin including a rear wall. A truck bed includes a front wall that faces the rear wall of the passenger cabin. A space is provided between the rear wall of the passenger cabin and the front wall of the truck bed. A combination absorber and seal member is mounted to the rear wall of the passenger cabin. The combination absorber and seal member includes an extended portion having an elongated dimension extending at an oblique angle to a vehicle lateral direction. The combination absorber and seal member is formed from a sound absorbing material and extends outward from the rear wall of the passenger cabin in a vehicle longitudinal direction toward the front wall of the truck bed providing a clearance of no more than about 15 mm between the extended portion and the front wall of the truck bed.

14 Claims, 4 Drawing Sheets

(56) References Cited

U.S. PATENT DOCUMENTS

| | | | | |
|---|---|---|---|---|
| 4,998,769 | A * | 3/1991 | Johnson | B62D 25/04 |
| | | | | 296/183.1 |
| 5,090,765 | A * | 2/1992 | Gremillion | B60J 1/20 |
| | | | | 296/180.1 |
| 5,516,185 | A * | 5/1996 | O'Donnell | B60P 3/36 |
| | | | | 277/645 |
| 5,660,427 | A * | 8/1997 | Freeman | B62D 33/02 |
| | | | | 296/183.1 |
| 8,801,077 | B2 | 8/2014 | Vogel et al. | |
| 10,093,150 | B2 | 10/2018 | Waldner | |
| 10,577,032 | B2 * | 3/2020 | Frederick | B60R 16/0231 |
| 2007/0267896 | A1 * | 11/2007 | Werner | B62D 33/02 |
| | | | | 296/203.04 |
| 2020/0070743 | A1 * | 3/2020 | Williams | B60R 13/06 |
| 2021/0188371 | A1 * | 6/2021 | Williams | B62D 33/00 |
| 2022/0148555 | A1 * | 5/2022 | Su | G10K 11/172 |

* cited by examiner

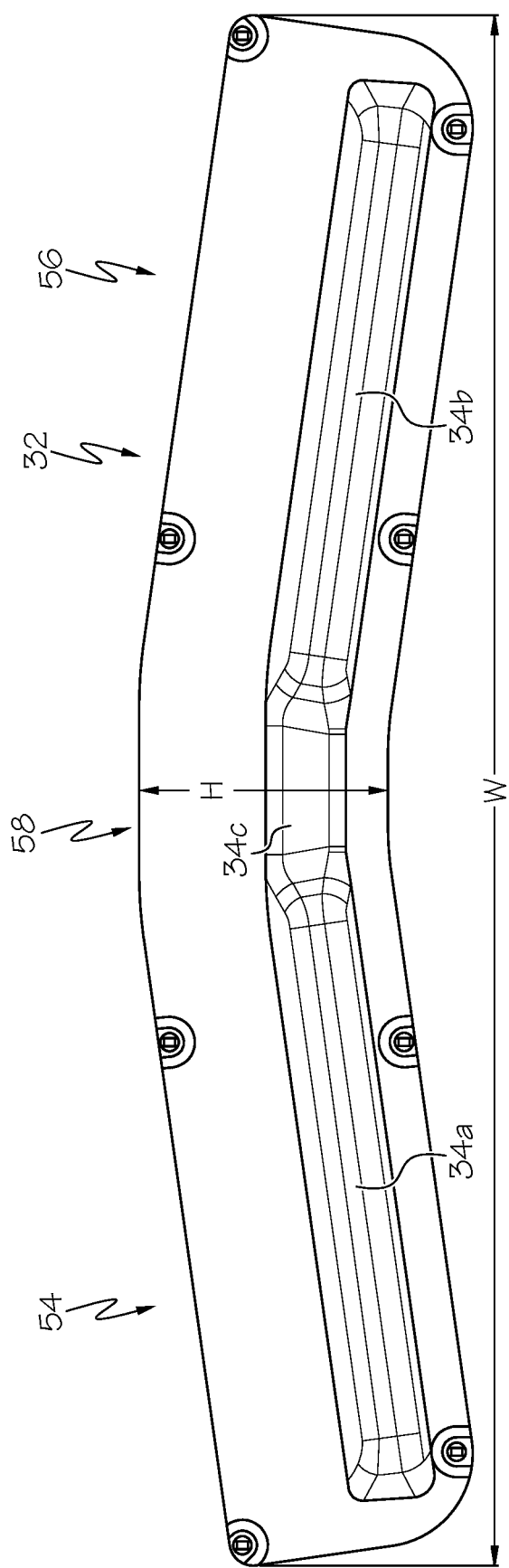

TRUCKS INCLUDING EXTERNALLY MOUNTED COMBINATION ABSORBER AND SEAL MEMBER

TECHNICAL FIELD

The present specification generally relates to seals and absorbers for pickup trucks and, more specifically, to pickup trucks that include externally mounted combination absorber and seal members.

BACKGROUND

Some pickup trucks have a cabin to bed seal to block airflow and sound from entering a gap between the cabin and bed and resonating. Some pickup trucks have a sound absorber between the cabin and bed to reduce the noise that can be heard from inside the cabin.

What is needed is to combine seals and absorbers to provide pickup trucks with externally mounted combination absorber and seal members.

SUMMARY

In accordance with one embodiment, a pickup truck includes a passenger cabin including a rear wall. A truck bed includes a front wall that faces the rear wall of the passenger cabin. A space is provided between the rear wall of the passenger cabin and the front wall of the truck bed. A combination absorber and seal member is mounted to the rear wall of the passenger cabin. The combination absorber and seal member includes an extended portion having an elongated dimension extending at an oblique angle to a vehicle lateral direction. The combination absorber and seal member is formed from a sound absorbing material and extends outward from the rear wall of the passenger cabin in a vehicle longitudinal direction toward the front wall of the truck bed providing a clearance of no more than about 15 mm between the extended portion and the front wall of the truck bed.

In accordance with another embodiment, a combination absorber and seal member mounts to a rear wall of a passenger cabin. The combination absorber and seal member includes an upper flange that mounts to the rear wall and a lower flange that mounts to the rear wall. An extended portion is located between the upper and lower flanges and has an elongated dimension that, when mounted to the rear wall, extends at an oblique angle to a vehicle lateral direction. The extended portion is formed from a sound absorbing material and extends outward from the rear wall of the passenger cabin in a vehicle longitudinal direction toward a front wall of a truck bed providing a clearance of no more than about 15 mm between the extended portion and the front wall of the truck bed.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 4 illustrates a front view the combination absorber and seal member of FIG. 2, according to one or more embodiments shown and described herein.

DETAILED DESCRIPTION

Pickup trucks according to the present specification include a passenger cabin and a truck bed located rearward of the passenger cabin. The passenger cabin includes a rear wall. A truck bed includes a front wall that faces the rear wall of the passenger cabin. A space is provided between the rear wall of the passenger cabin and the front wall of the truck bed. A combination absorber and seal member is mounted to an external surface of the rear wall of the passenger cabin. The combination absorber and seal member has an elongated dimension extending partially in a vehicle lateral direction that is molded from a sound absorbing material. The combination absorber and seal member extends outward from a rear wall of the cabin in a vehicle longitudinal direction toward the front wall of a truck bed providing a clearance of no more than about 15 mm. The elongated dimension of the combination absorber and seal member is oblique to the vehicle lateral direction.

Figure 1:
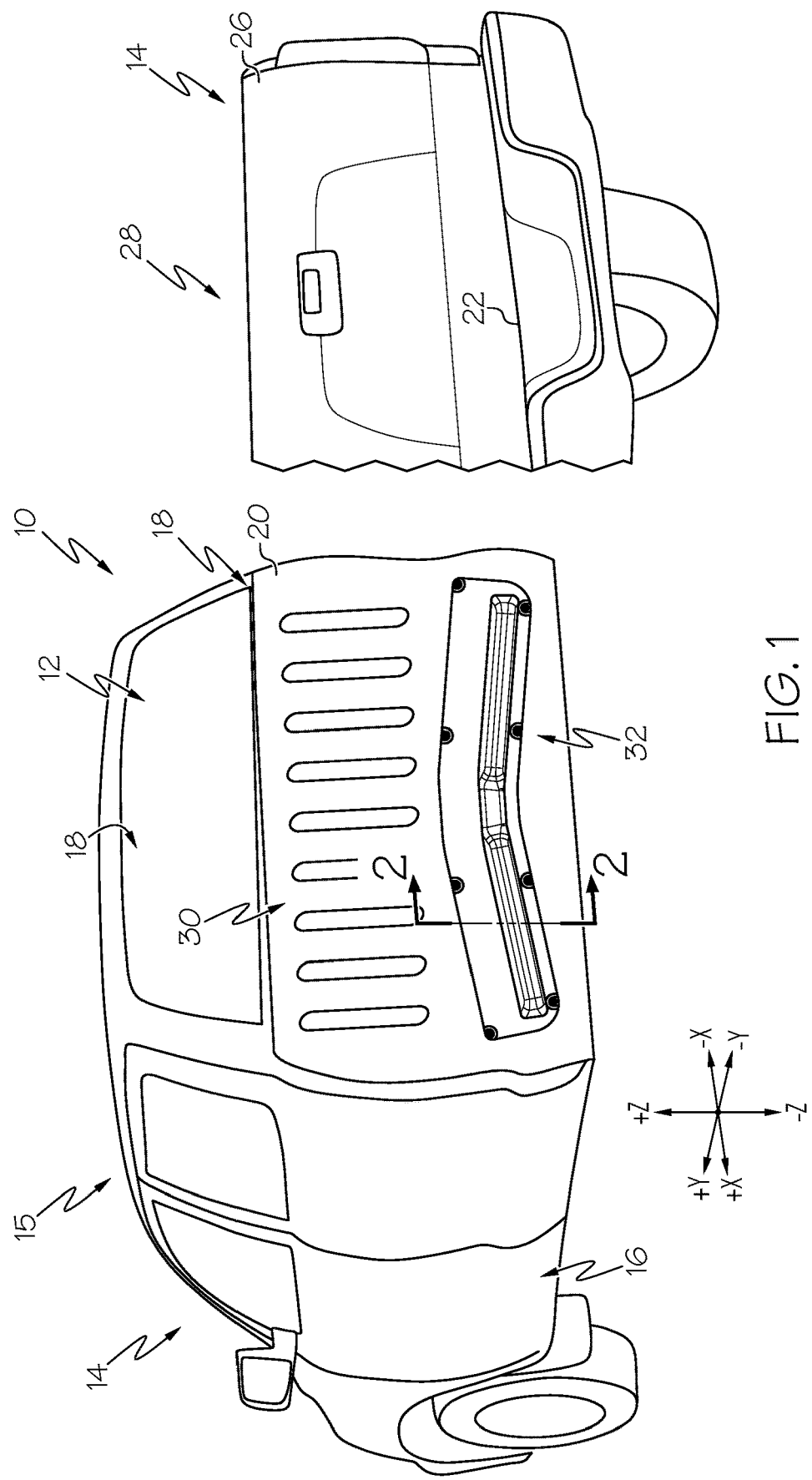
FIG. 1 schematically depicts a partial view of a pickup truck having a truck bed and a combination absorber and seal member mounted to a rear wall of a passenger cabin, according to one or more embodiments shown and described herein.

As used herein, the term "vehicle longitudinal direction" refers to the forward-rearward direction of the pickup truck (i.e., in the +/− vehicle Y direction depicted in FIG. 1). The term "vehicle lateral direction" refers to the cross-pickup truck direction (i.e., in the +/− vehicle X direction depicted in FIG. 1), and is transverse to the vehicle longitudinal direction. The term "vehicle vertical direction" refers to the upward-downward direction of the pickup truck (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring to FIG. 1, the terms "outboard" or "outward" as used herein refers to the relative location of a component in a direction with respect to a pickup truck centerline. The term "inboard" or "inward" as used herein refers to the relative location of a component in a direction with respect to the pickup truck centerline. Because the pickup truck structures may be generally symmetrical about the pickup truck centerline, the direction to which use of terms "inboard," "inward," "outboard" and "outward" refer may be mirrored about the pickup truck centerline when evaluating components positioned along opposite sides of the pickup truck 10.

Referring to FIG. 1, the pickup truck is generally illustrated at 10. The pickup truck 10 includes a passenger cabin 12 and a truck bed 14. The passenger cabin 12 includes a front 15, sides 16 and a rear 18 where a rear wall 20 of the passenger cabin 12 is located. The truck bed 14 includes a floor 22 (FIG. 2), a pair of spaced apart sidewalls (removed for clarity), a front wall 24 (FIG. 2), and a rear wall 26. The floor 22, the sidewalls, the front wall 24, and the rear wall 26 define a storage area 28 of the truck bed 14.

In some embodiments, it is appreciated, that the rear wall 26 is pivotally connected to the sidewalls as a tailgate for movement between a closed position and an open position. In the closed position, the rear wall 26 extends parallel to the vehicle vertical direction. In the open position, the rear wall 26 extends parallel to the vehicle longitudinal direction.

Figure 2:
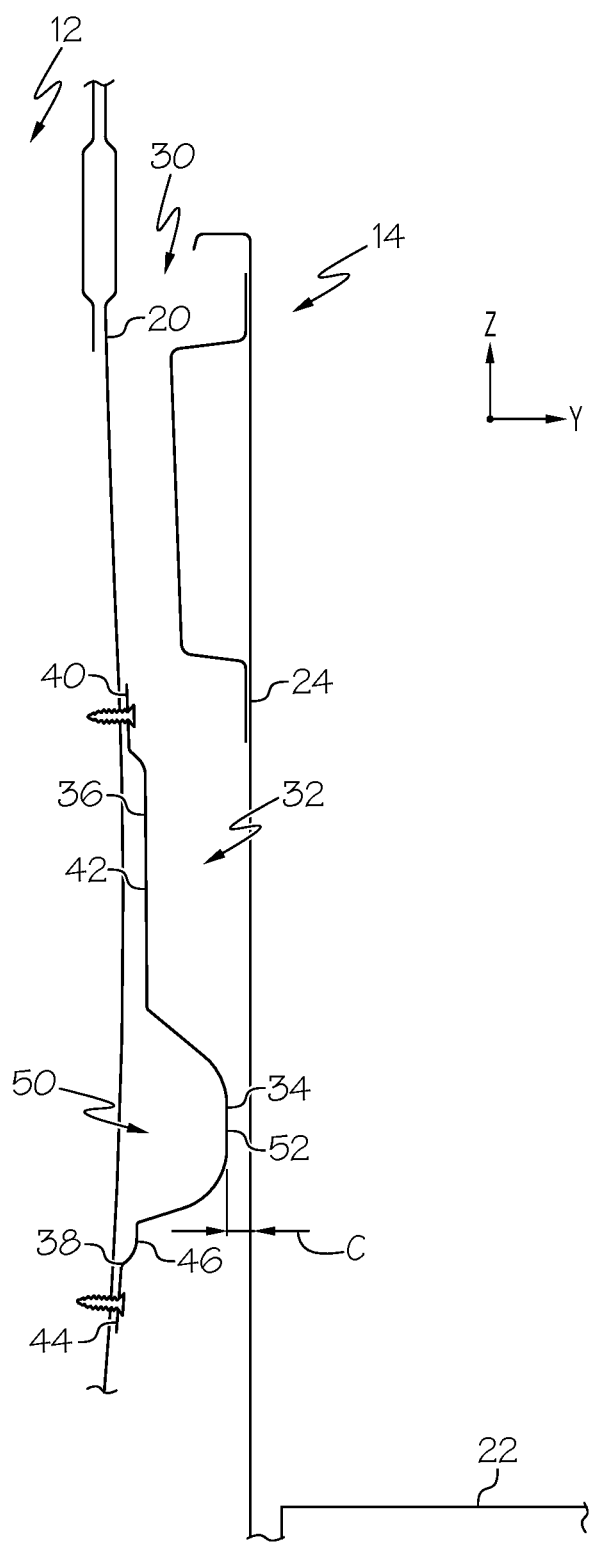
FIG. 2 depicts a section view of the combination absorber and seal member of FIG. 1 along line 2-2, according to one or more embodiments shown and described herein.
Figure 3:
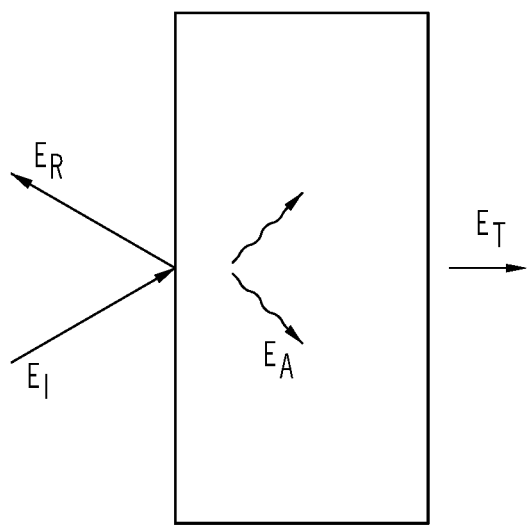
FIG. 3 illustrates a method of determining a sound absorption coefficient, according to one or more embodiments shown and described herein.

Referring also to FIG. 2, a space 30 is provided between the rear wall 20 of the passenger cabin and the front wall 24 of the truck bed 14. A combination absorber and seal member 32 is mounted to an external surface of the rear wall 20 of the passenger cabin 12. The combination absorber and seal member 32 has an elongated dimension extending partially in a vehicle lateral direction that is molded from a sound absorbing material to form a sound absorbing structure. As an example, the sound absorbing material may be a combination of polypropylene (PP) and polyethylene terephthalate (PET) fibers. As used herein, a "sound absorbing structure" refers to a structure having a sound absorption coefficient of at least about 0.2 when mounted at a desired location, such as at least about 0.3, such as at least about 0.4, such as at least about 0.5. Various factors can influence the sound absorption coefficient for a given structure, such as the mounting method, material type and thickness. Referring briefly to FIG. 3, with aid of equations 1, 2, 3, and 4 the sound absorption coefficient, a can be calculated $$\alpha = E_A/E_I; \quad (1)$$

$$\alpha = 1 - E_R/E_I; \quad (2)$$

$$\alpha = 1 - |r|^2; \quad (3)$$

$$\alpha = I_{Abs}/I_I. \quad (4)$$

where, $\alpha$=sound absorption coefficient, $E_I$=incident energy, $E_R$=reflection energy, $E_A$=absorbed energy, r=incident reflection factor, $I_{Abs}$=sound intensity absorbed, $I_I$=incident sound intensity. Standardized test procedures may be used, such as ASTM C423.

Referring again to FIG. 2, the combination absorber and seal member 32 extends outward from the rear wall 20 of the cabin 12 in the vehicle longitudinal direction toward the front wall 24 of a truck bed 14 providing a clearance C between the combination absorber and seal member 32 and front wall 24 of no more than about 15 mm, such as no more than about 10 mm, such as no more than about five mm. In some embodiments, the combination absorber and seal member 32 may touch off to the front wall 24 of the truck bed 14, providing a clearance of about zero. Thus, in some embodiments, the clearance may be between zero and 15 mm, such as between one mm and 15 mm, such as between five and 15 mm. It has been found that increasing the clearance to greater than 15 mm can reduce the noise and vibration performance of the combination absorber and seal member 32.

As shown in FIG. 2, the combination absorber and seal member 32 includes an extended portion 34, an upper flange portion 36 and a lower flange portion 38. The upper flange portion 36 and the lower flange portion are on opposite sides of the extended portion 34. The upper flange portion 36 may be taller than the lower flange portion 38, as shown by FIG. 2. The upper flange portion 36 includes a touch area 40 and an offset area 42. The touch area 40 is in contact with the rear wall 20 of the cabin 12 while the offset area 42 is offset from the rear wall 20 of the cabin 12 to reduce the area of contact between the combination absorber and seal member 32 and the rear wall 20. The lower flange portion 38 may also have a touch area 44 and an offset area 46. The combination absorber and seal member 32 is mounted to the rear wall 20 in the touch areas 40 and 44. As can be seen by FIG. 2, the combination absorber and seal member 32 may have a thickness such that an air gap 50 is provided between the combination absorber and seal member 32 and the rear wall 20.

The extended portion 34 extends longitudinally outward from the upper and lower flange portions 36 and 38 to an apex 52 forming a somewhat rounded profile. The apex 52 is the location or area of maximum longitudinal extent and is where the clearance C is measured from.

FIG. 4 illustrates a forward view of the combination absorber and seal member 32. The combination absorber and seal member 32 generally has an elongated width W that is greater than a height H. The combination absorber and seal member 32 includes outer portions 54 and 56 and a central portion 58. Each outer portion 54, 56 and central portion 58 includes their own extended portions 34a, 34b and 34c. The outer portions 54 and 56 both extend at angles that are oblique to the vehicle lateral direction. The outer portions 54 and 56 are on opposite sides of the central portion 58 that extends substantially in the vehicle lateral direction. In this regard, the outer portions 54 and 56 extend outwardly from the central portion 58 at angles of less than 180 degrees to the central portion 58. The oblique angle of the outer portions 54 and 56 can promote movement of debris between the rear wall 20 and the front wall 24 to dislodge and move out of the space between the rear wall 20 and front wall 24.

In some embodiments, the central portion 58 may extend outward from the rear wall 20 in the vehicle longitudinal direction an amount that is less than the outer portions 54 and 56. Thus, the gap between the central portion 58 and the front wall 24 of the truck bed 14 may be greater at the central portion 58 than at the outer portions 54 and 56. The larger gap can allow for increased air flow at the central portion, which can increase air passage and improve aerodynamics.

The above-described combination absorber and seal members are located in the space rear walls of truck cabins and front walls of truck beds and provide both sealing and noise reduction properties. The combination absorber and seal members are formed of a sound absorbing material and extend outward from the rear walls of the cabins toward the front walls of the truck beds providing a clearance between the two of no more than about 15 mm in order to provide sound reduction and sealing functions.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pickup truck comprising:
   a passenger cabin comprising a rear wall;
   a truck bed comprising a front wall that faces the rear wall of the passenger cabin, wherein a space is provided between the rear wall of the passenger cabin and the front wall of the truck bed; and
   a combination absorber and seal member mounted to the rear wall of the passenger cabin, the combination absorber and seal member including an extended portion having an elongated dimension extending at an oblique angle to a vehicle lateral direction that is formed from a sound absorbing material and extends outward from the rear wall of the passenger cabin in a vehicle longitudinal direction toward the front wall of the truck bed providing a clearance of no more than about 15 mm between the extended portion and the front wall of the truck bed.

2. The pickup truck of claim 1, wherein the extended portion is a first extended portion of a first outer portion of the combination absorber and seal member, the combination absorber and seal member comprises a central portion including a second extended portion and a second outer portion including a third extended portion.

3. The pickup truck of claim 2, wherein the third extended portion has an elongated dimension extending at an oblique angle to the vehicle lateral direction.

4. The pickup truck of claim 3, wherein the second extended portion of the central portion extends outward in the vehicle longitudinal direction less than the first and third extended portions providing a greater clearance between the second extended portion and the front wall of the truck bed than at the first extended portion.

5. The pickup truck of claim 1, wherein the combination absorber and seal member comprises an upper flange portion and a lower flange portion on opposite sides of the extended portion, wherein the combination absorber and seal member is mounted to the rear wall of the passenger cabin at the upper and lower flange portions.

6. The pickup truck of claim 5, wherein the upper flange portion includes a touch area that is in contact with the rear wall of the passenger cabin and an offset area that is offset from the rear wall of the passenger cabin.

7. The pickup truck of claim 5, wherein the lower flange portion includes a touch area that is in contact with the rear wall of the passenger cabin and an offset area that is offset from the rear wall of the passenger cabin.

8. A combination absorber and seal member that mounts to a rear wall of a passenger cabin, the combination absorber and seal member comprising:
   an upper flange that mounts to the rear wall;
   a lower flange that mounts to the rear wall; and
   an extended portion between the upper and lower flanges having an elongated dimension that, when mounted to the rear wall, extends at an oblique angle to a vehicle lateral direction, the extended portion being formed from a sound absorbing material and extending outward from the rear wall of the passenger cabin in a vehicle longitudinal direction toward a front wall of a truck bed providing a clearance of no more than about 15 mm between the extended portion and the front wall of the truck bed.

9. The combination absorber and seal member of claim 8, wherein the extended portion is a first extended portion of a first outer portion of the combination absorber and seal member, the combination absorber and seal member comprises a central portion including a second extended portion and a second outer portion including a third extended portion.

10. The combination absorber and seal member of claim 9, wherein the third extended portion has an elongated dimension extending at an oblique angle to the vehicle lateral direction.

11. The combination absorber and seal member of claim 10, wherein the second extended portion of the central portion extends outward in the vehicle longitudinal direction less than the first and third extended portions providing a greater clearance between the second extended portion and the front wall of the truck bed than at the first and third extended portions.

12. The combination absorber and seal member of claim 8, wherein the combination absorber and seal member is mounted to the rear wall of the passenger cabin at the upper and lower flange portions.

13. The combination absorber and seal member of claim 12, wherein the upper flange portion includes a touch area that contacts the rear wall of the passenger cabin and an offset area that is offset from the rear wall of the passenger cabin when the combination absorber and seal member is mounted to the rear wall of the passenger cabin.

14. The combination absorber and seal member of claim 12, wherein the lower flange portion includes a touch area that contacts the rear wall of the passenger cabin and an offset area that is offset from the rear wall of the passenger cabin when the combination absorber and seal member is mounted to the rear wall of the passenger cabin.

* * * * *

UNITED STATES PATENT AND TRADEMARK OFFICE
CERTIFICATE OF CORRECTION

PATENT NO. : 11,492,052 B2
APPLICATION NO. : 17/218443
DATED : November 8, 2022
INVENTOR(S) : Adam D. Holmstrom et al.

It is certified that error appears in the above-identified patent and that said Letters Patent is hereby corrected as shown below:

In the Specification

In Column 3, Line(s) 27, after "coefficient,", delete "a" and insert --$\alpha$--, therefor.

Signed and Sealed this
Seventh Day of March, 2023

Katherine Kelly Vidal
*Director of the United States Patent and Trademark Office*